July 22, 1952 O. M. SINNETT 2,603,934
RAKE ATTACHMENT FOR TRACTORS
Filed Nov. 17, 1950 2 SHEETS—SHEET 2
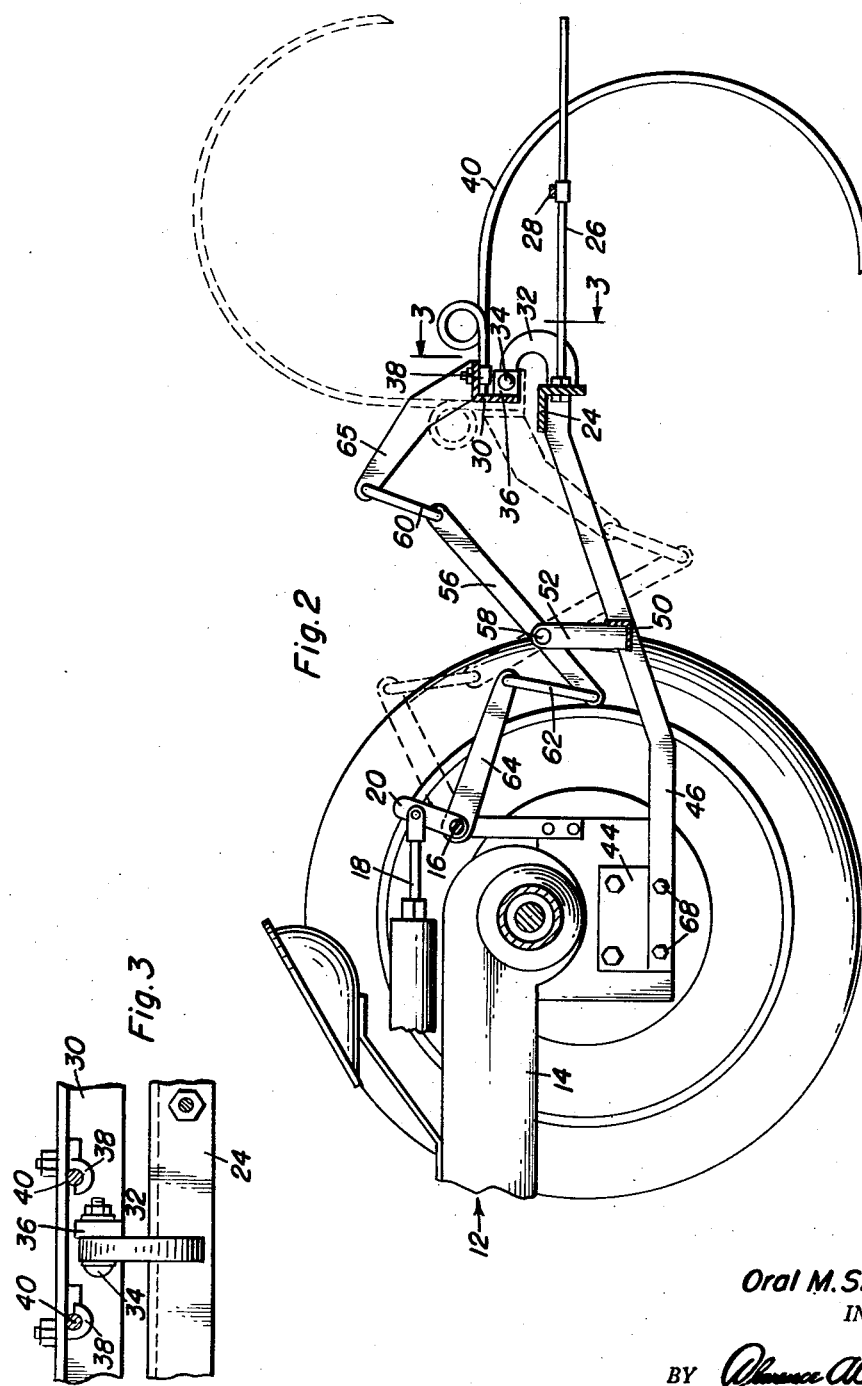
Oral M. Sinnett
INVENTOR.

Patented July 22, 1952

2,603,934

UNITED STATES PATENT OFFICE 2,603,934

RAKE ATTACHMENT FOR TRACTORS

Oral M. Sinnett, Walton, W. Va.

Application November 17, 1950, Serial No. 196,224

1 Claim. (Cl. 56—27)

This invention relates to improvements in farm implements.

An object of this invention is to provide a rake of the type adapted to be drawn by a tractor which is of improved construction and to provide an improved linkage assembly mounted on arms which are fixed at their outer ends to a part of the rake assembly and removably secured at their inner ends to the tractor chassis.

Another object of this invention is to provide a relatively inexpensive rake attachment for a tractor which is very easily and rapidly attached to and detached from a standard tractor.

Other objects and features of importance will become apparent in following the description of the illustrated form of the invention.

In the drawings:

Figure 2 is a sectional view taken substantially on the line 2—2 of Figure 1 and in the direction of the arrows; and Figure 3 is an enlarged fragmentary sectional view taken substantially on the line 3—3 of Figure 2 and in the direction of the arrows.

Figure 1:
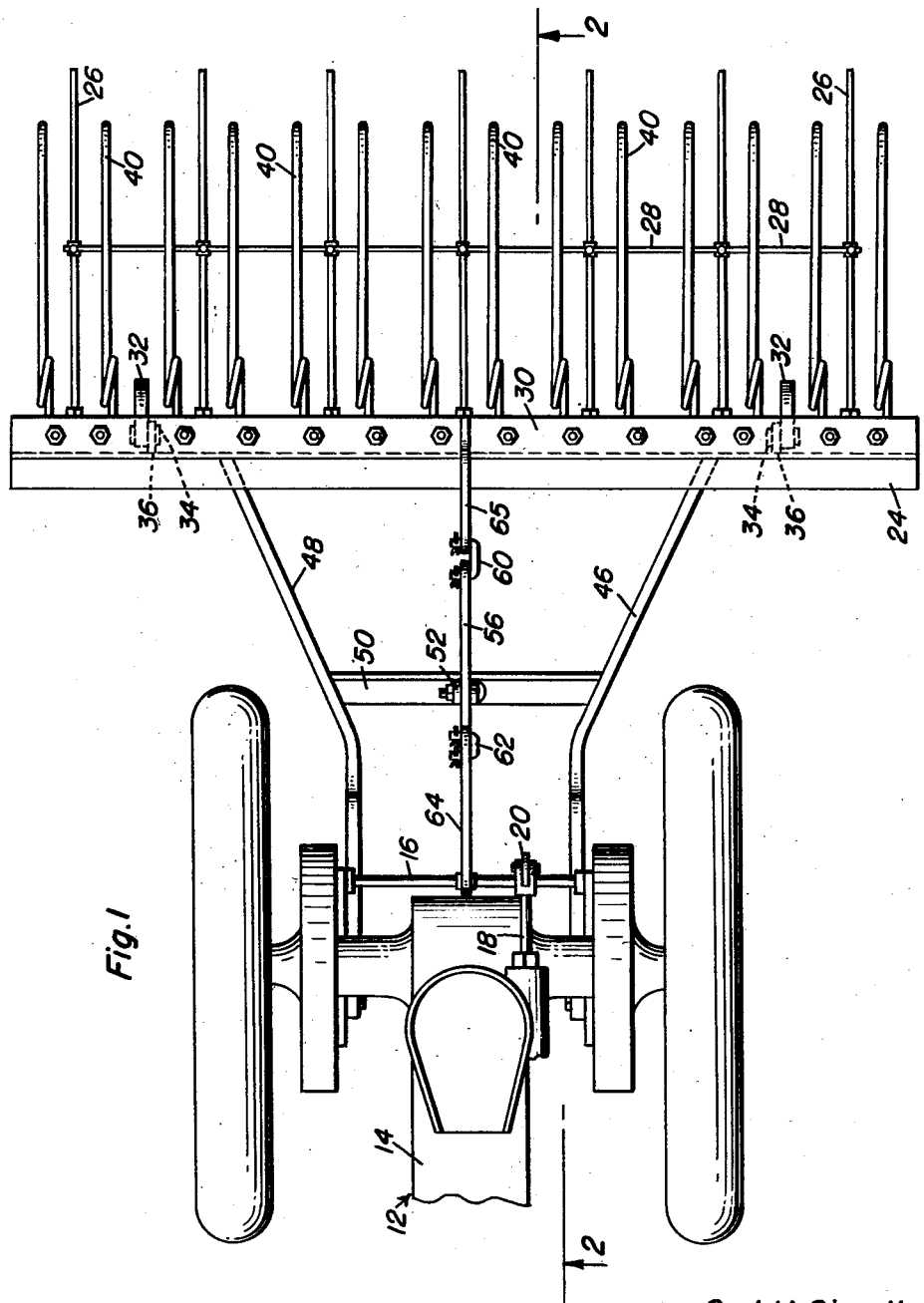
Figure 1 is a plan view of the attachment showing it secured to a fragmentary part of a standard tractor.

In the drawings I have illustrated a fragmentary part of a standard tractor 12 which has various elements known in the art, among which is the tractor chassis 14, rocker shaft 16 and piston rod 18 connected to it for rocking the shaft through the medium of the arm 20 which is pivoted to the piston rod 18 and which is fixed to the rocker shaft 16.

There is a stationary transverse bar 24 of angle iron construction providing a pair of flanges. One flange is normally located in the horizontal plane when the device is properly attached to a tractor and the other flange is vertical. The vertical flange has a plurality of stripping rods 26 secured thereto, the stripping rods being held in proper spaced relationship by means of a transverse brace 28.

A transverse rockable bar 30 is mounted on the bar 24 by a hinge construction said bar 30 being of angle iron. A plurality of goose neck brackets 32, constituting a part of the hinge construction, are fixed, as by welding, to the vertical flange of the stationary bar 24 and are hinged, as by the hinge pins 34, to brackets 36, said brackets 36 being fixed to one of the flanges of the bar 30.

The horizontal flange of the bar 30 is provided with a plurality of holders 38, these holders being in the form of small clamps, whereby the standard spring teeth 40 may be held at their inner ends to the bottom surface of said horizontal flange of said bar 30.

In order to fasten the rake to the chassis 14 of the tractor, the tractor drawbar brackets 44 are used. There is a pair of rearwardly divergent arms 46 and 48 (Figure 1) which are fixed, as by welding, to the bar 24 at their outer ends and which are removably secured to the chassis 14 by employment of the tractor drawbar brackets 44.

There is a brace 50 secured at its ends to the arms 46 and 48 and a post 52 rises therefrom, being welded or otherwise rigidly fixed thereon.

There is a means provided for actuating the rockable bar 30 hingedly in order to raise and lower the teeth 40. The preferable actuating means consists of a lever 56 which is pivoted intermediate its ends by means of a pin 58 to the post 52. A link 60 is connected to one end of the lever 56 and a link 62 is connected with the other end of the lever 56. The link 62 is pivoted to the tractor hydraulic rocker shaft arm 64, this arm being standard equipment. The link 60 is pivoted to an arm 65 fixed, as by welding, on the bar 30.

In operation, the piston rod 18 is caused to be actuated either inwardly or outwardly of its cylinder. Upon movement of the piston rod 18 the tractor hydraulic rocker shaft arm 64 is caused to be operated about the rocker shaft 16 as a pivot axis. This movement is imparted to the lever 56 through the link 62 and from the lever 56 to the arm 65 through the link 60. Accordingly, since the arm 65 is fixed to the bar 30, said bar is caused to move about the hinge pins 34 as pivot axes.

Inspection of Figure 2 shows that the device is very easily attached to and detached from the tractor. The bolts 68 are simply removed from connection with the drawbar brackets and the link 62 removed from the rocker shaft arm 64. Inasmuch as the links are of substantially U-shape construction and the end portions thereof pass through suitable means in the rocker shaft arm 64, arm 65 and lever 56, removal of the cotter pins (Figure 1) allows the links to be readily removed.

To attach the device to a tractor the inverse order of steps is suggested.

Having described the invention, what is claimed as new is:

A dump rake attachment for tractors of the type including a hydraulic lift, comprising a pair of rearwardly divergent arms mounted on the rear end portion of the tractor, a stationary transverse bar mounted on the rear ends of said arms, gooseneck brackets fixed on said bar, a transverse rockable bar hingedly mounted on said brackets, spring teeth mounted on said rockable bar, an arm fixed on said rockable bar, a brace extending between the first named arms, a post rising from said brace, a lever pivotally mounted, at an intermediate point, on said post, a substantially U-shaped link connecting one end of said lever to the second named arm, means including a substantially U-shaped link detachably connecting the other end of the lever to the hydraulic lift for actuating the rockable bar for raising and lowering the teeth, stationary stripping rods fixed on the stationary bar and extending rearwardly therefrom between the teeth, and a transverse brace extending between said stripping rods.

ORAL M. SINNETT.

REFERENCES CITED

The following references are of record in the file of this patent:

UNITED STATES PATENTS

| Number | Name | Date |
|---|---|---|
| 353,397 | Bentel | Nov. 30, 1886 |
| 1,331,481 | Burgess | Feb. 24, 1920 |
| 2,366,234 | Blaydes | Jan. 2, 1945 |
| 2,475,908 | McCleskey | July 12, 1949 |
| 2,487,483 | Smith | Nov. 8, 1949 |
| 2,535,812 | Phillips | Dec. 26, 1950 |

FOREIGN PATENTS

| Number | Country | Date |
|---|---|---|
| 7,479 | France | June 4, 1907 |

First addition to 375,724.